(12) United States Patent
Takenami

(10) Patent No.: US 9,574,873 B2
(45) Date of Patent: Feb. 21, 2017

(54) POSITION DETECTION SYSTEM FOR DETECTING POSITION OF OBJECT

(71) Applicant: FANUC Corporation, Yamanashi (JP)

(72) Inventor: Mototsugu Takenami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/884,797

(22) Filed: Oct. 16, 2015

(65) Prior Publication Data

US 2016/0116272 A1  Apr. 28, 2016

(30) Foreign Application Priority Data

Oct. 24, 2014  (JP) ................ 2014-217683

(51) Int. Cl.
| | | |
|---|---|---|
| *G01B 11/14* | (2006.01) | |
| *B25J 17/02* | (2006.01) | |
| *B25J 19/02* | (2006.01) | |

(52) U.S. Cl.
CPC ............ *G01B 11/14* (2013.01); *B25J 17/0233* (2013.01); *B25J 19/023* (2013.01); *Y10S 901/44* (2013.01)

(58) Field of Classification Search
CPC ..... G01B 11/026; G01B 11/002; G01B 11/14; G01S 5/163; G01S 5/16
USPC ........................................... 356/614
See application file for complete search history.

(56) References Cited

U.S. PATENT DOCUMENTS

| | | | |
|---|---|---|---|
| 2005/0195409 | A1 | 9/2005 | Watanabe et al. |
| 2005/0249100 | A1* | 11/2005 | Tatekawa ............. G11B 17/021 369/178.01 |
| 2008/0271332 | A1* | 11/2008 | Jordil ..................... G01B 5/008 33/503 |
| 2011/0131823 | A1* | 6/2011 | Matsuyama ............. G01B 5/20 33/200 |

FOREIGN PATENT DOCUMENTS

| | | |
|---|---|---|
| JP | 56-145302 A | 11/1981 |
| JP | 59-148801 A | 8/1984 |
| JP | 60-76208 U | 5/1985 |
| JP | 05-241626 A | 9/1993 |
| JP | 2003-31075 A | 1/2003 |
| JP | 2005-251086 A | 9/2005 |
| JP | 2007-40822 A | 2/2007 |
| JP | 2012-58056 A | 3/2012 |
| JP | 2012-141430 A | 7/2012 |

* cited by examiner

*Primary Examiner* — Tarifur Chowdhury
*Assistant Examiner* — Md M Rahman
(74) *Attorney, Agent, or Firm* — Hauptman Ham, LLP

(57) ABSTRACT

A position detection system includes: a contactor including a tracing unit that traces and fits with a recess or a protrusion of an object; a slide member; a sliding unit that causes the slide member to slide in two directions; a moving unit that causes the contactor to move in a direction perpendicular to a plane so as to cause the tracing unit of the contactor to trace and fit with the recess or the protrusion of the object; a contactor detecting unit that detects a position of the contactor in the plane; and an object position detecting unit that detects the position of the object based on movement amount of the contactor before and after the slide member slides on the sliding unit to slide, when the tracing unit traces the recess or the protrusion.

12 Claims, 5 Drawing Sheets

POSITION DETECTION SYSTEM FOR DETECTING POSITION OF OBJECT

RELATED APPLICATIONS

The present application claims priority to Japanese Application Number 2014-217683, filed Oct. 24, 2014, the disclosure of which is hereby incorporated by reference herein in its entirety.

BACKGROUND OF THE INVENTION

1. Technical Field

The present invention relates to a position detection system for detecting a position of an object having a recess or a protrusion.

2. Description of Related Art

As disclosed in Japanese Laid-open Patent Publication No. H05-241626, it has been common practice to determine an accurate position of an object by correcting detection data of the object acquired using a visual sensor or a camera. In Japanese Laid-open Patent Publication No. 2005-251086: an object is detected by a visual sensor provided on a robot; subsequently the visual sensor is moved by the robot; and an identical object is detected by the visual sensor thus moved. Further, in Japanese Laid-open Patent Publication No. 2005-251086, a determination is made as to whether the result of the detection by the visual sensor relates to an identical object.

However, when the object has a portion such for example as a recess or a protrusion that is difficult to detect by the visual sensor, an erroneous detection tends to occur. This may make it not possible to detect an accurate position of the object, thus lowering the operating efficiency.

The present invention has been made in view of such circumstances, and an object thereof is to provide a position detection system that is capable of accurately detecting a position of an object, even when the object has a recess or a protrusion.

SUMMARY OF THE INVENTION

In order to achieve the above object, according to a first aspect of the present invention, there is provided a position detection system for detecting a position of an object having a recess or a protrusion, the system including: a contactor including a tracing unit that traces and fits with the recess or the protrusion of the object; a slide member configured integrally with the contactor; a sliding unit that causes the slide member to slide in two directions perpendicular to each other; a moving unit that causes the contactor to move in a direction perpendicular to a plane defined between the two directions so as to cause the tracing unit of the contactor to trace and fit with the recess or the protrusion of the object; a contactor detecting unit that is in a fixed positional relationship with a base of the sliding unit and detects a position of the contactor in the plane; and an object position detecting unit that detects a position of the object based on the position of the contactor detected by the contactor detecting unit before and after the slide member slides on the sliding unit, when the tracing unit of the contactor traces the recess or the protrusion of the object.

According to a second aspect of the present invention, in the first aspect, when the moving unit causes the contactor to move in at least one direction of the two directions, the position of the object is detected based on the movement amount of the contactor by the moving unit and the movement amount of the contactor when the slide member slides on the sliding unit.

According to a third aspect of the present invention, in the first or second aspect, the contactor is a camera.

According to a fourth aspect of the present invention, in any one of the first to third aspects, the moving unit is a robot.

According to a fifth aspect of the present invention, in any one of the first to fourth aspects, the object has a recess, and the contactor is a cone fittable with the recess.

According to a sixth aspect of the present invention, in any of the first to fourth aspects, the object has a conical protrusion, and the contactor has a cylindrical portion fittable with the protrusion.

These and other objects, features, and advantages of the present invention will become more apparent from a detailed description of exemplary embodiments of the present invention illustrated in the accompanying drawings.

DETAILED DESCRIPTION

Figure 1:
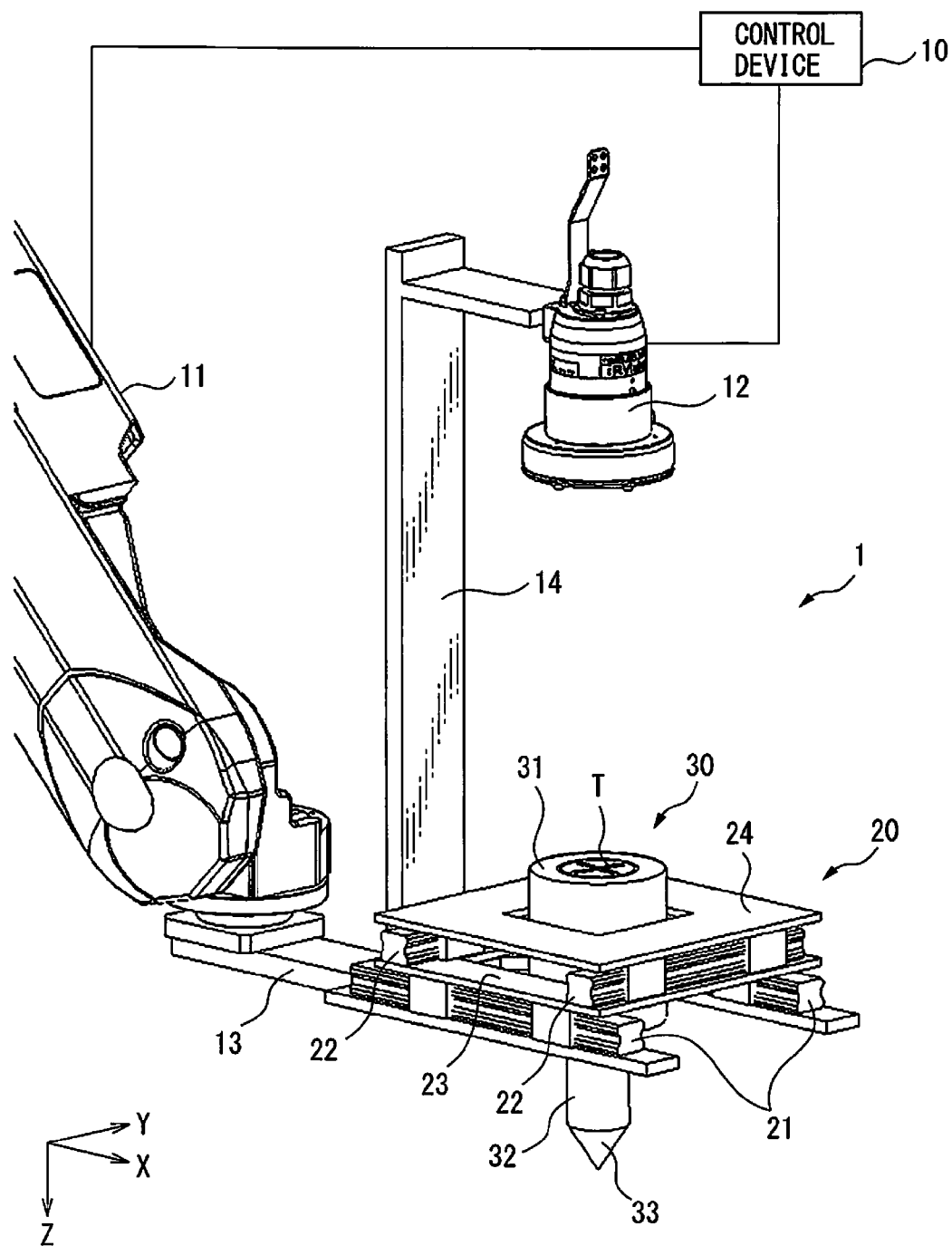
FIG. 1 is a perspective view illustrating a position detecting system based on the present invention.

Embodiments of the present invention will now be described with reference to the accompanying drawings. Throughout the drawings, like reference numerals are assigned to like elements. In order to facilitate understanding, the scale of the drawings is appropriately changed.

FIG. 1 is a perspective view illustrating a position detection system based on the present invention. As illustrated in FIG. 1, the position detection system 1 includes mainly a moving unit 11, a contactor detecting unit 12, and a control device 10 that controls the moving unit 11 and the contactor detecting unit 12. Further, the control device 10 functions as an object position detecting unit that detects a position of an object as described hereinafter.

The moving unit 11 is a perpendicular articulated robot, for example, and instead may be another type of robot or another mechanism unit that can move in a vertical direction. Meanwhile, the contactor detecting unit 12 is a visual sensor or a camera. In the following, a description will be made on the assumption that the moving unit 11 is a robot and the contactor detecting unit 12 is a camera.

As illustrated, a base member 13 is attached to a distal end of the robot 11. Further, the camera 12 is attached to a distal end of a bracket 14 fixed in such a manner as to extend substantially vertically with respect to the base member 13.

Further, a sliding mechanism unit 20 is attached to the base member 13. More specifically, mutually parallel two X-axis rails 21 of the sliding mechanism unit 20 are provided on the upper surface of the base member 13. It is assumed that the positional relationship among the base member 13, the bracket 14, and the two X-axis rails 21 is such that they are fixed with respect to each other and are moved in unison when the robot 11 moves. Further, as illustrated, a first slider 23 of the sliding mechanism unit 20 is slidably located on the two X-axis rails 21.

On the upper surface of the first slider 23 are provided mutually parallel two Y-axis rails 22 of the sliding mechanism unit 20. These Y-axis rails 22 are perpendicular to the above-mentioned X-axis rails. A second slider 24 of the sliding mechanism unit 20 is slidably located on the two Y-axis rails 22.

Further, a generally cylindrical contactor 30 is inserted and fixed in an opening provided at the center of the second slider 24. Upper surface 31 of the contactor 30 is parallel with respect to the upper surface of the second slider 24, and a target T is provided thereon. As can be seen from FIG. 1, the target T is located below the camera 12 in the range of view of the camera 12. Preferably, both the X-direction defined by the X-axis rails 21 and the Y-direction defined by the Y-axis rails 22 lie in a horizontal plane. Thus the upper surface of the second slider 24 lies in a horizontal plane.

As illustrated in FIG. 1, the contactor 30 extends downwardly between the two Y-axis rails 22 and between the two X-axis rails 21. An extension unit 32 extends from the lower surface of the contactor 30, and a tracing unit 33 is provided on the distal end of the extension unit 32. Preferably, the contactor 30, the extension unit 32, and the tracing unit 33 have a common center axis.

The extension unit 32 has a size greater than that of a recess formed on an object, which will be described hereinafter. The tracing unit 33 has a shape adapted to trace and fit with the recess of the object. In FIG. 1, for example, the extension unit 32 is of a cylindrical shape having a diameter greater than that of the recess, and the tracing unit 33 is of a conical shape such for example as a cone provided on the distal end of the extension unit 32.

Figure 2:
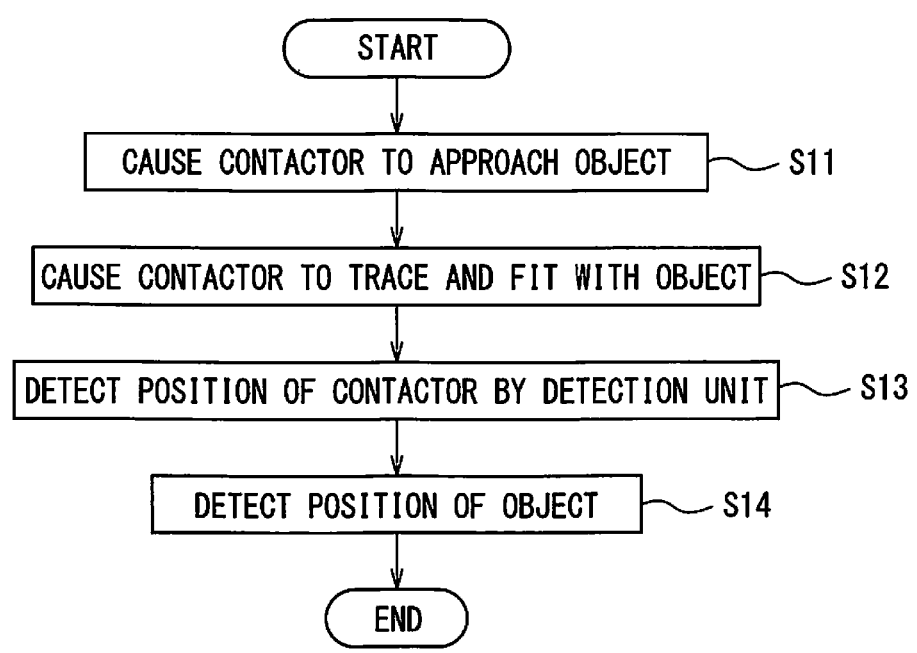
FIG. 2 is a flow chart illustrating the operation of the position detection system illustrated in FIG. 1.
Figure 3A:
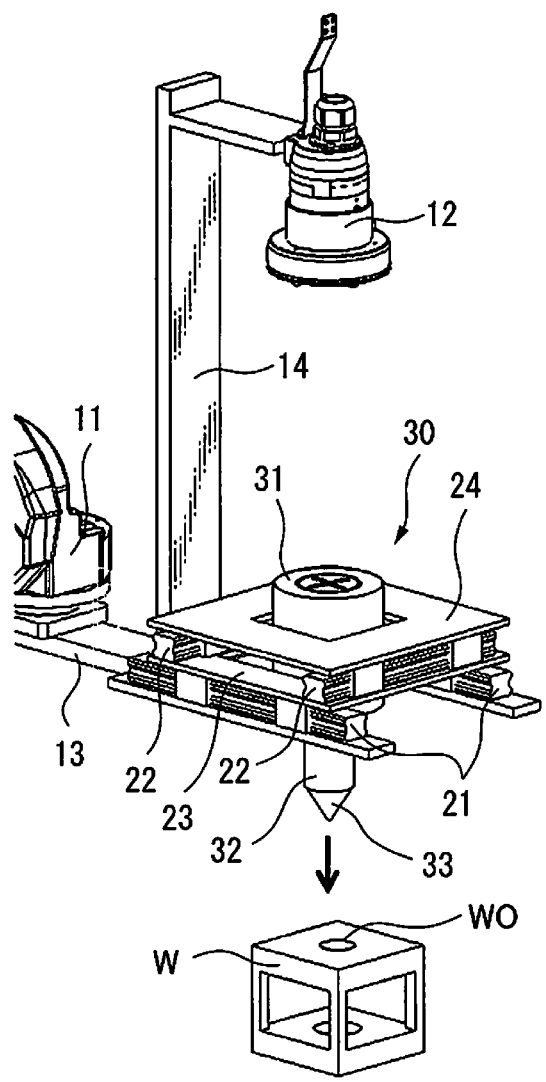
FIG. 3A is a first perspective view for explaining the operation of the position detection system.
Figure 3B:
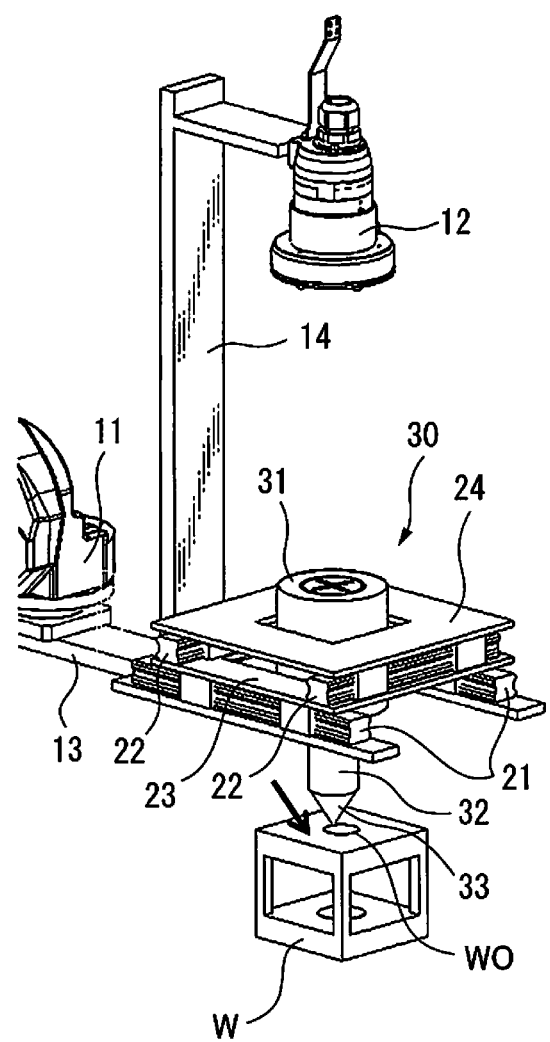
FIG. 3B is a second perspective view for explaining the operation of the position detection system.
Figure 3C:
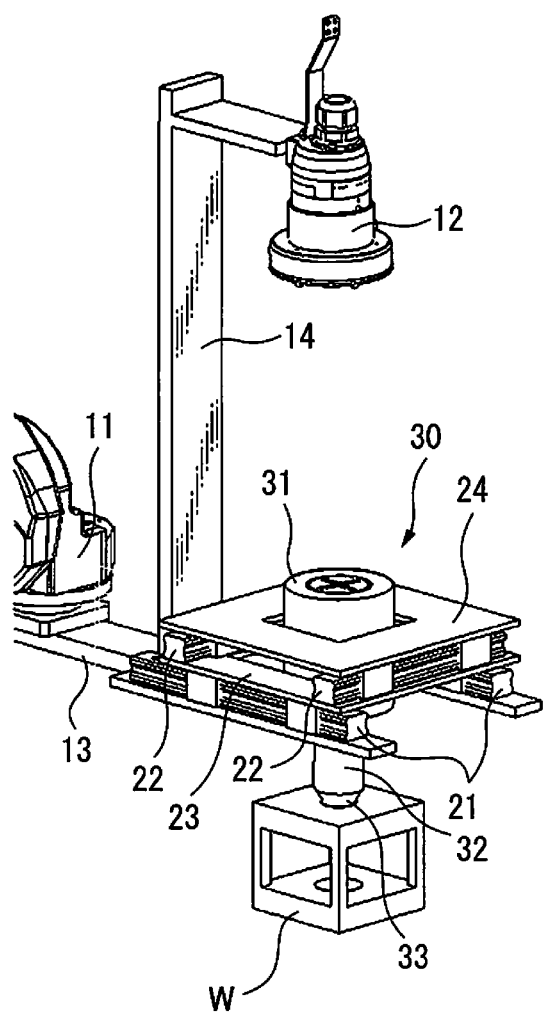
FIG. 3C is a third perspective view for explaining the operation of the position detection system.

FIG. 2 is a flow chart illustrating the operation of the position detection system illustrated in FIG. 1. Further, FIGS. 3A through 3C are perspective views for explaining the operation of the position detection system. A description will now be made of the operation of the position detection system according to the present invention with reference to the drawings.

Prior to the operation of the position detection system 1, the first slider 23 and the second slider 24 each are located at a predetermined initial position thereof. It is assumed, in this regard, that the first slider 23 and the second slider 24 will not be changed in position when the robot 11 is merely moved in the horizontal and/or vertical direction.

As illustrated in FIG. 3A, the object W is of a generally cubic shape in which an opening W0 is formed in the top face. A cylindrical recess extends from the opening W0 through the interior of the object W. It is assumed that the following description applies to an object W of another shape having a similar recess as well.

Firstly, at step S11 of FIG. 2, the control device 10 causes the robot 11 to move so that the base member 13 is made to approach above the object W. Since the robot 11 is operated in accordance with a simple program, in the present invention, the base member 13 can be made to approach above the object W easily and accurately.

As described above, the base member 13, the bracket 14, the camera 12, and the two X-axis rails 21 are operated in unison so that when the base member 13 is moved, the camera 12 is also moved likewise. As such, as illustrated in FIG. 3A, the contactor 30 is located generally above the object W.

The movements of the base member 13, etc. at step S11 may include both horizontal and vertical movements. Preferably, the distance between the contactor 30 and the object W illustrated in FIG. 3A is in a predetermined range. When the contactor 30 is located generally above the object W, the camera 12 picks up an image of the target T of the contactor 30, and the image is stored in the control device 10.

At step S12, the base member 13, etc. are moved only downwardly toward the object W by the robot 11 as illustrated by an arrow mark in FIG. 3A. In this manner, as illustrated in FIG. 3B, the distal end of the tracing unit 33 enters the opening W0 so that a part of the side surface of the tracing unit 33 contacts a part of the opening W0.

As the base member 13, etc. are moved further downwardly by the robot 11, the tracing unit 33 descends while tracing the opening W0. In response to this descending operation, the contactor 30 and the second slider 24 are moved slightly in at least one of the X-direction and the Y-direction along the X-axis rail 21 and the Y-axis rail 22. As illustrated in FIG. 3C, a part of the side surface of the tracing unit 33 fits with the opening W0 over the entire circumference thereof. When the tracing unit 33 of the contactor 30 fits with the opening W0, the contactor 30 is prevented from moving any further in the X-direction and in the Y-direction. Then, the descending operation by the robot 11 is also ended.

Subsequently, at step S13, the target T of the contactor 30 is imaged by the camera 12, and the image is stored in the control device 10. Thereupon, the control device 10 compares the image imaged at step S13 with the above-mentioned image and thus detects the movement amount of the contactor 30 in the X-direction and in the Y-direction. Finally, at step S14, the control device 10 detects a position of the object W in the X-Y plane based on the movement amount of the contactor 30 in the X-direction and in the Y-direction.

Alternatively, the control device 10 may process the image imaged at step S13, detect the movement amounts of the first slider 23 and the second slider 24 from their initial positions, and detect the position of the object W, with such movement amounts being the movement amounts of the contactor 30. In such an instance, it is unnecessary for the camera 12 to pick up an image at step S11, and a single image processing suffices.

In this manner, in the present invention, the contactor 30, which has traced and fitted with the object W, is detected, instead of the object W being detected directly by the camera 12. When the tracing unit 33 of the contactor 30 fits with the opening W0 of the object W, the contactor 30 is moved in the X-direction and in the Y-direction along the X-axis rail 21 and the Y-axis rail 22. Thus, it is possible to indirectly grasp the position of the object W by detecting the movement amount of the contactor 30 using the camera 12.

Consequently, in the present invention, it is possible to accurately detect the position of the object W even when the object W has a recess or a protrusion. In other words, in the present invention, it is possible to achieve a stable detection without being influenced by the feature of the object W, since the camera 12 does not detect the shape of the object W directly. As such, erroneous detection of the object W by the camera 12 decreases so that the operating efficiency is increased.

Meanwhile, at step S11, the robot 11 may move the base member 13 and the camera 12, etc. in the horizontal direction. In this instance, the control device 10 stores the movement amount of the base member 13, etc. moved in the X-direction and in the Y-direction by the robot 11. Further, at step S14, the control device 10 detects the position of the object W using both the movement amount of the contactor 30 in the X-direction and in the Y-direction and the stored movement amount of the base member 13, etc. in the X-direction and in the Y-direction. In such an instance, it will be appreciated that the object W can be detected over a wide range since the base member 13, etc. are moved by the robot 11.

In an unillustrated embodiment, the object has a protrusion, e.g., a conical protrusion. It is assumed, in this regard, that a recess, which is fittable with the protrusion and similar to that described above, is formed in the bottom surface of the extension unit 32 of the contactor 30. In this instance, the shape of the recess is a shape corresponding to the bottom surface of the conical protrusion. Meanwhile, it is to be understood that the present invention encompasses a case in which the protrusion or the recess has a different cross-sectional shape and a case in which the recess or the protrusion is cylindrical.

ADVANTAGE OF THE INVENTION

In the first embodiment, the contactor is made to trace and fit with the object using the physical feature of the object. Then, the contactor detecting unit detects the contactor and indirectly grasps a position of the object. Thus, even with an object having a recess or a protrusion, it is possible to accurately detect a position of the object. Consequently, erroneous detection of the object by the contactor detecting unit decreases so that the operating rate is increased.

In the second embodiment, the object can be detected over a wide range when the contactor is moved by the moving unit.

In the third embodiment, the position of the contactor can be detected with ease via an analysis of an image acquired by imaging by the camera.

In the fourth embodiment, the object can be easily approached by operating the robot in accordance with a simple program.

In the fifth and sixth embodiments, it is possible, by a relatively simple structure, to cause the contactor to trace and fit with the object While the present invention has been described using exemplary embodiments, those skilled in the art could understand that the above-described changes as well as various other changes, omissions, and additions are possible without departing from the scope of the present invention.

What is claimed is:

1. A position detection system for detecting a position of an object having a recess or a protrusion, the position detection system comprising:
 a contactor including an end configured to physically contact, trace and fit with the recess or the protrusion of the object;
 a sliding mechanism that causes the contactor to slide in two directions perpendicular to each other;
 a robot configured to cause the contactor to move in a direction perpendicular to a plane defined by the two directions so as to cause the end of the contactor to physically contact, trace and fit with the recess or the protrusion of the object;
 a camera in a fixed positional relationship to a base of the sliding mechanism and configured to detect a position of the contactor in the plane; and
 a controller configured to detect the position of the object based on a movement amount of the contactor before and after the contactor slides on the sliding mechanism when the end of the contactor physically traces the recess or the protrusion of the object.

2. The position detection system according to claim 1, wherein, when the contactor is moved by the robot in at least one of the two directions, the controller is configured to detect the position of the object based on (i) the movement amount of the contactor by the robot and (ii) the movement amount of the contactor by the sliding mechanism.

3. The position detection system according to claim 1, wherein the object has a recess, and the end of the contactor is a cone fittable with the recess.

4. The position detection system according to claim 1, wherein the object has a conical protrusion, and the end of the contactor has a cylindrical portion fittable with the protrusion.

5. The position detection system according to claim 1, wherein the controller is configured to detect the position of the object based on an image of the contactor, said image captured by the camera.

6. The position detection system according to claim 1, wherein the controller is configured to detect the position of the object based on a single image of the contactor, said single image captured by the camera when the end of the contactor physically fits with the recess or the protrusion of the object.

7. The position detection system according to claim 1, wherein the controller is configured to detect the position of the object by comparing first and second images of the contactor,
 said first image captured by the camera when the contactor is at a location over the object but the end of the contactor does not yet physically fit with the recess or the protrusion of the object, and
 said second image captured by the camera when the end of the contactor physically fits with the recess or the protrusion of the object.

8. The position detection system according to claim 1, wherein
 at least one of the sliding mechanism or the robot is configured to cause the contactor to move relative to the object to a location where the contactor is over the object but the end of the contactor does not yet physically fit with the recess or the protrusion of the object, and then
 the robot is configured to move the contactor from said location only downwardly in the direction perpendicular to said plane, while enabling the contactor to slide in said two directions as the end of the contactor physically contacts, traces and eventually fits with the recess or the protrusion of the object.

9. The position detection system according to claim 8, wherein the controller is configured to detect the position of the object based on a single image of the contactor, said single image captured by the camera when the end of the contactor physically fits with the recess or the protrusion of the object.

10. The position detection system according to claim 8, wherein the controller is configured to detect the position of the object by comparing first and second images of the contactor,
 said first image captured by the camera when the contactor is at said location over the object but the end of the contactor does not yet physically fit with the recess or the protrusion of the object, and
 said second image captured by the camera when the end of the contactor physically fits with the recess or the protrusion of the object.

11. The position detection system according to claim 1, wherein the contactor has, on a surface facing the camera, a target, and the controller is configured to detect the position of the object based on an image of the target, said image captured by the camera.

12. A position detection system for detecting a position of an object having a recess or a protrusion, comprising:

a contactor including an end that traces and fits with the recess or the protrusion of the object;

a sliding mechanism that causes the contactor to slide in two directions perpendicular to each other;

a robot that causes the contactor to move in a direction perpendicular to a plane defined between the two directions so as to cause the end of the contactor to trace and fit with the recess or the protrusion of the object;

a camera that is in a fixed positional relationship to a base of the sliding mechanism and detects a position of the contactor in the plane; and a controller that detects the position of the object based on movement amount of the contactor before and after the contactor slides on the sliding mechanism when the end of the contactor traces the recess or the protrusion of the object.

* * * * *